United States Patent [19]

Potter

[11] Patent Number: 4,750,924

[45] Date of Patent: Jun. 14, 1988

[54] CLEAN AIR FLOW AND TEMPERATURE EQUALIZING APPARATUS

[76] Inventor: Frank Potter, 270 Adams Blvd., Farmingdale, N.Y. 11735

[21] Appl. No.: 70,226

[22] Filed: Jul. 6, 1987

[51] Int. Cl.⁴ .............................................. B01D 46/02
[52] U.S. Cl. ........................................ 55/472; 55/473
[58] Field of Search ................. 55/472, 473; 98/115.3

[56] References Cited

U.S. PATENT DOCUMENTS

| | | | |
|---|---|---|---|
| 1,958,768 | 5/1934 | Ross | 55/472 |
| 3,375,640 | 4/1968 | Pelosi, Jr. | 55/473 X |
| 3,496,703 | 2/1970 | MacLeod et al. | 55/473 X |
| 3,616,624 | 11/1971 | Marsh | 55/472 |
| 3,802,168 | 4/1974 | Deckas | 55/473 |
| 3,812,370 | 5/1974 | LaViolette | 55/473 X |
| 3,828,530 | 8/1974 | Peters | 55/473 |
| 3,925,043 | 12/1975 | Matrone et al. | 55/473 X |
| 3,928,008 | 12/1975 | Petersen | 55/473 X |
| 3,935,803 | 2/1976 | Bush | 55/473 X |
| 4,191,543 | 3/1980 | Peters | 55/473 X |
| 4,210,429 | 7/1980 | Golstein | 55/473 X |
| 4,249,463 | 2/1981 | Hornby | 98/115.3 |
| 4,268,285 | 5/1981 | Mason | 55/473 X |
| 4,377,399 | 3/1983 | Bryson | 55/472 X |
| 4,531,956 | 7/1985 | Howorth | 55/473 X |
| 4,606,260 | 8/1986 | Cox | 98/115.3 |
| 4,625,633 | 12/1986 | Martin | 98/115.3 |
| 4,660,462 | 4/1987 | Thompson et al. | 55/473 X |

FOREIGN PATENT DOCUMENTS 1454637 3/1969 Fed. Rep. of Germany ........ 55/472

Primary Examiner—Robert Spitzer
Attorney, Agent, or Firm—Nicholas J. Garofalo

[57] ABSTRACT

Apparatus for filtering impurities from the air of a room and recirculating its including a cabinet in which a motorized blower unit functions to intake room air and blow its through a filter unit into an upper compartment or the cabinet from where it escapes through multiple vents in the cabinet to recirculate in the ambient atmosphere of the room.

5 Claims, 1 Drawing Sheet

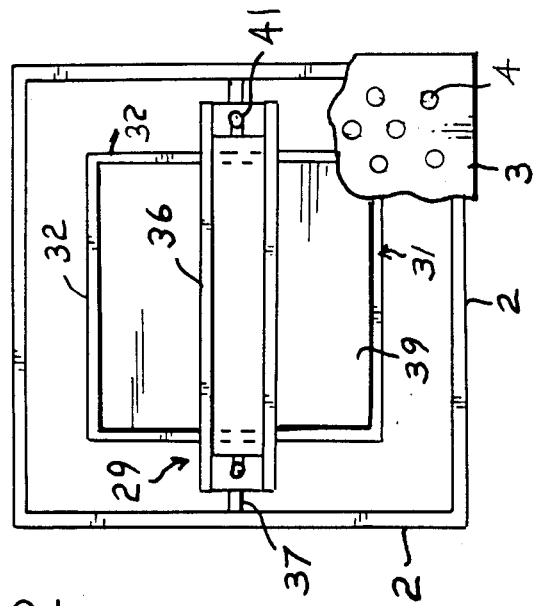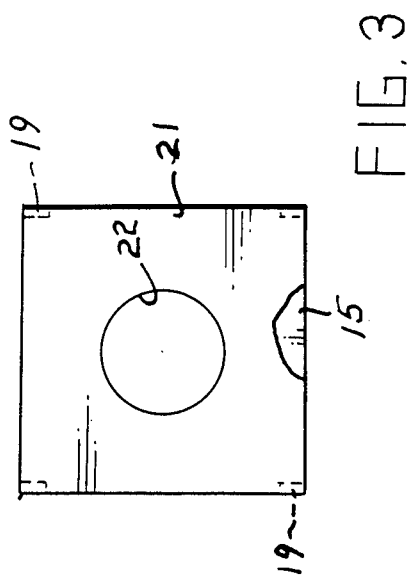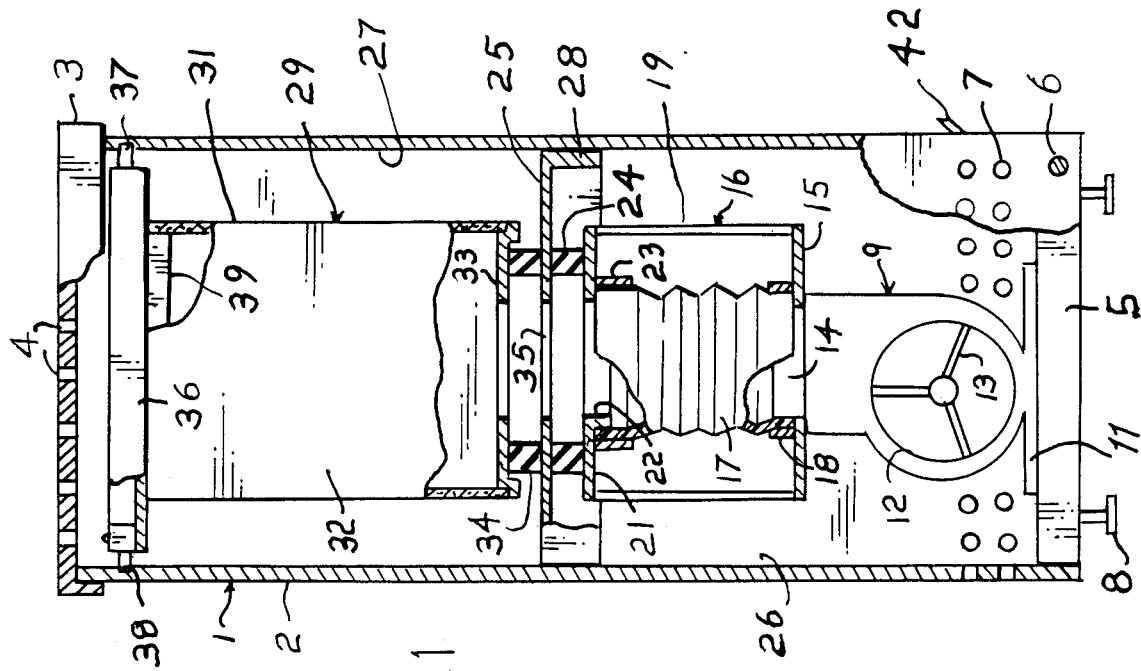

CLEAN AIR FLOW AND TEMPERATURE EQUALIZING APPARATUS

BACKGROUND OF THE INVENTION

This invention is directed to apparatus that is operable to maintain a clean ambient air and a uniform temperature condition in a room, particularly a large room occupied by a number of workers, such as an office.

In the usual open office containing a cluster of desks and workers the continued daily activity, vigor, alertness and pleasant disposition of the workers depends to a considerable extent upon the condition of the surrounding air. Temperature variations in different areas of the office, together with stale air tends to cause discomfort, drowsiness and undesirable mental attitudes of the workers with resultant decreased efficiency.

Normally, the air and temperature condition throughout large open offices is not uniform. Some areas are uncomfortably warm or cold, or the air is fouled by dust, smoke and close activity of the workers.

Accordingly, a general object of this invention is to provide simple but practical means whereby the temperature of a room, particularly a large room such as an office, will be made uniform throughout the office and the ambient air will be constantly filtered and recirculated as clean air.

A further object of this invention is to provide apparatus of a portable nature which may be manually moved about without difficulty to any desired location in an office, and which will be operable to constantly draw in ambient air, filter it and cause it to be recirculated as clean air throughout the office.

Another object of this invention is to provide apparatus for the foregoing purposes which is subject to quick and easy assembly or disassembly for repairs, cleaning or replacement of parts.

The foregoing objects as well as others will become apparent as this specificatio continues in further detail.

BRIEF SUMMARY OF THE INVENTION

In accordance with the invention there is provided an air filtering apparatus which is lightweight and is manually moveable with little effort about a floor surface to any selected location. It includes a cabinet having a lower compartment containing a motorized air intake blower unit. The unit is adapted to draw air through vents in the cabinet and force the air through a flexible tube into a filter unit seated in an upper compartment of the cabinet. The air is cleaned of impurities as it issues from the filter unit. The cleaned air, still under pressure, escapes through vents in the cabinet to surrounding room area. As the operation of the apparatus continues, the ambient air is continually recirculated. As a result the ambient air of the room or office in which the apparatus is located progressively obtains a clean refreshing condition and the room temperature is brought to a desirable uniform degree.

Except for the communication of the blower unit through the flexible tube with the filter unit, the upper and lower compartments of the cabinet are effectively sealed from one another against air leakage by means of a closely fitting baffle plate dividing the two compartments from one another.

The cabinet itself comprises an open ended tubular shell or body having a removable cover over its open top end, and having a base slidably received and releasably secured in its bottom end. This construction enables the various units housed within the cabinet to be readily and easily removed for repairs, replacement or cleaning. When this is desired, the means securing the base to the cabinet is disconnected and the body of the cabinet is then simply slidably lifted clear of the base and the various units mounted upon the base.

The foregoing structure of the invention, its features and advantages will become increasingly apparent as this specification unfolds in greater detail and as it is read in conjunction with the accompanying drawing. However, it is to be expressly understood that the drawing is for purposes of illustration and description, and it is not to be construed as limiting the scope of the invention.

BRIEF DESCRIPTION OF THE DRAWING

In the accompanying drawing:

FIG. 1 is a side elevational view of an apparatus embodying the invention with some portions broken away;

FIG. 2 is a top plan view of the apparatus with a portion of the cover broken away; and FIG. 3 is a plan view of the flexible tube supporting bracket.

DETAILED DESCRIPTION OF THE INVENTION

The clean air flow and temperature equalizing apparatus embodying the invention, as illustrated in the drawing, includes a cabinet in which the components of the apparatus are housed. The cabinet comprises an elongated tubular shell or body 1, which has four side walls 2 at right angles to one another and which is open at its top and bottom ends. A flanged cover 3 provided with multiple vents 4 is removably seated over the open top end; and a base 5 is slidably fitted in the open bottom end. The base is retained in place by means of screws 6 fixing it to the walls of the body. Vents 7 are provided in the lower portions of the walls of the body above the base. A foot 8 in the form of a leveler is mounted to the underside of each corner of the base. The feet may be individually adjusted to obtain a level disposition of the cabinet upon a floor surface.

The components of the apparatus disposed within the cabinet include an electrically motorized air intake blower unit 9. It is fixed by means of a mounting plate 11 at its bottom to the surface of the base 5. An air inlet opening 12 in a side wall of the unit communicates with a motor driven air intake fan 13. An air outlet end of the unit is defined by a neck 14, about which is seated a bottom plate 15 of a flexible tube supporting unit or bracket 16. The lower end of a flexible tube 17 is sleeved about the neck and is secured to it by a ring clamp 18. The clamp abuts and holds the bottom plate seated upon a shoulder of the neck.

Extending upwardly from the bottom plate 15 of the bracket 16 is a group of arms 19 upon which is fixed in parallel relation to the bottom plate, a top plate 21. The latter has an axial opening defined by a depending annular flange 22, which is sleeved by the upper end of the flexible tube 17. A ring clamp 23 secures the flexible tube to the flange.

Seated upon the top plate 21 in coaxial relation to the opening in the latter is a seal ring 24 having a relatively greater inner diameter than that of the opening. The seal ring is of resilient material, such as rubber. Seated upon the seal ring is a horizontally disposed diaphragm or baffle plate 25, which divides the interior of the cabinet into a lower compartment 26 and an upper compartment 27. The baffle plate is of rectangular form, complementing the interior of the cabinet, and it has four depending side flanges 28 abutting the walls of the cabinet. The baffle plate has been initially slidably entered up through the bottom end of the body of the cabinet during assembly of the apparatus. The baffle plate also serves as a support for an air filter unit 29 located in the upper compartment of the cabinet.

The filter unit includes a tubular filter cartridge 31 which has four firm side walls 32 of air filtering material for cleansing passing air of various impurities, such as dust and smoke. The walls of the cartridge are fixed to a stiff bottom plate 33. The cartridge is seated with its bottom plate upon a seal ring 34 mounted on the upper surface of the baffle plate; and the bottom plate of the cartridge has an axial opening communicating through an axial opening 35 in the baffle plate with the outlet end at 22 of the flexible tube 17. The openings, respectively in the bottom plate of the cartridge, in the baffle plate and at the outlet end of the flexible tube, are axially aligned and preferably of the same diameter.

The filter unit is releasably clamped against movement relative to its seated condition by means of a clamp bar 36, which is adapted by means of spring loaded detents 37 mounted on its ends to obtain locking engagement with opposed walls of the cabinet. In this respect, the clamp bar is fixed to the surface of a rectangular plate 39 and extends beyond opposite ends of the latter. The plate 39 is slidably positioned in a complementary open top end of the cartridge and is held in place by means of end portions of the clamp bar which overhang the top edges of opposed walls of the cartridge. The clamped condition of the filter unit is obtained by manually pressing the clamp bar and cartridge downward to obtain a compressed condition of the underlying seal ring 34 and to effect engagement of the spring loaded detents 37 in pockets 38 in opposed walls of the cabinet.

The filter unit may be released from its clamped condition by manually actuating a slide pin 41 to disengage the detents from the pockets. The clamp bar together with the filter unit may then be lifted out of the top end of the cabinet for replacement of the cartridge with a fresh clean one.

Ample clearance spaces the blower unit 9 from the side walls of the cabinet so as to allow free flow of inlet air through the side wall vents 7 to the intake opening 12 of the blower unit. Ample clearance also spaces the top end and sides of the filter unit 29 from the cover 3 and the side walls of the cabinet, so as to allow free flow of filtered air from the filter unit to the escape vents 4 of the cover 3.

In the operation of the apparatus, upon actuating an electric switch 42 the motorized fan 13 of the blower unit operates to draw ambient air through the vents 7 into the inlet opening 12, and to blow it through the flexible tube 17 into the filter cartridge 31. In the cartridge, the air strikes the underface of the plate 39 of the clamp bar and is caused to swirl about within the cartridge over its four walls. And the swirling air issues through the walls of the cartridge to the surrounding space within the upper compartment 27 of the cabinet. In passing through the walls of the cartridge the air is filtered clean of impurities. The filtered air then escapes with continued force through the vents 4 of the cover and circulates throughout the room. As the operation of the apparatus continues, the clean filtered air issuing from it will in a brief period replace the stale air of the room and bring the ambient temperature throughout the room to a uniform degree.

Further, the advantageous overall structure of the apparatus is such that the several units housed within the cabinet may with a minimum of effort be removed from the cabinet for cleaning, repairs or replacement. In this respect, it is only needed to remove the screws 6 securing the base 5 to the cabinet. The body 1 of the cabinet may then be slidably lifted clear of the internal units of the cabinet. The several units may, if needed, be cleaned, repaired or replaced.

While an embodiment of the invention has been illustrated and described in detail, it is to be expressly understood that the invention is not limited thereto. Various changes of form, design or arrangement may be made in its components without departing from the spirit and scope of the invention. It is my intent, therefore, to claim the invention not only as shown and described but also in all such forms and modifications or equivalents thereof as might be construed to be within the spirit of the invention when considered in the light of the specification, the drawing and the appended claims.

What is claimed is:

1. A clean air flow apparatus intended to stand upon the floor of a room, the apparatus comprising: a vertically elongated cabinet having four side walls, a disconnectable base closing a bottom end of the cabinet, and a removable cover covering a top end of the cabinet; a diaphragm having four flanged side walls slidably received in the cabinet in bearing relation but unattached to the walls of the cabinet, the diaphragm dividing the interior of the cabinet into an upper compartment and a lower compartment and blocking flow of air from one compartment to the other; a motor driven air intake blower unit having a mounting plate at its underside mounted within the lower compartment upon the base, the blower unit being operable for drawing air through vents in the side walls of the cabinet into an inlet of the blower unit and discharging the air through an outlet end of the blower unit; a vertically disposed flexible tube having an inlet end connected to the outlet end of the blower unit; a resilient seal ring seated upon an upper face of the diaphragm; an air filter unit seated within the upper compartment upon the seal ring, the filter unit having a bottom inlet communicating through the seal ring and an opening in the diaphragm with an outlet end of the flexible tube; a lower resilient seal ring mounted about and sealing the outlet end of the flexible tube relative to an underface of the diaphragm against leakage of air from the outlet end of the flexible tube to the lower compartment; the filter unit serving to filter air entering it from the flexible tube and to allow the filtered air to pass to the upper compartment; the cover having multiple vents allowing escape of the filtered air from the upper compartment to the ambient air outside of the cabinet; and the cabinet being adapted upon the base being disconnected from it to be slidably lifted free of the diaphragm and the foregoing other elements disposed within the cabinet.

2. A clean air flow apparatus as in claim 1, wherein a clamp bar releasably engaged at its ends with opposed interior walls of the cabinet is seated atop the filter unit and is holding the filter unit pressed down upon the underlying seal ring.

3. A clean air flow apparatus as in claim 2, wherein the clamp bar has detent elements at its ends releasably engaged in pockets in the opposed interior walls of the cabinet.

4. A clean air flow apparatus as in claim 3, wherein the filter unit has a tubular firm walled cartridge and a stiff bottom plate seated upon the underlying seal ring, and the clamp bar has fixed to its underside a plate conforming to and slidably fitted in an open top end of the cartridge.

5. A clean air flow apparatus intended to stand upon the floor of a room, the appratus comprising: a cabinet having an openended tubular shell, a base disconnectible from the shell closing over its bottom end and a cover seated over its top end; an air intake blower unit within the shell having a mounting plate at its underside mounted upon the base; a vertically disposed flexible tube within the shell connected to an outlet end of the blower unit; a bracket supported at a lower end thereof upon a neck of the blower unit and having an upper horizontal plate engaged about an outlet end of the flexible tube; a resilient first seal ring seated upon the horizontal plate in coaxial relation to the outlet end of the flexible tube; a diaphragm slidably entered into the shell and seated upon the first seal ring, the diaphragm dividing the interior of the shell into an upper and a lower compartment and blocking flow of air about it from one compartment to the other; a resilient second seal ring seated atop the diaphragm; an air filter unit within the shell seated atop the second seal ring having an inlet opening in a bottom end thereof coaxial with the second seal ring, with an opening in the diaphragm and with the outlet end of the flexible tube; a clamp bar releaseably engaged at opposite ends thereof with opposed interior walls of the shell seated atop the filter unit and holding the filter unit pressed down upon the second seal ring; the blower unit being operable to draw air through vents in the shell and to blow the air through the flexible tube and the filter unit into the upper compartment; the cover having multiple vents allowing the air entering the upper compartment to flow out into the ambient atmosphere; and the blower unit, the flexible tube, the bracket, the diaphragm and the filter unit being unattached to the shell whereby the shell is adapted to be manually lifted free thereof when the shell is disconnected from the base.

* * * * *